US011153006B2

United States Patent
Sun et al.

(10) Patent No.: US 11,153,006 B2
(45) Date of Patent: Oct. 19, 2021

(54) UPLINK TRANSMISSION PUNCTURING TO REDUCE INTERFERENCE BETWEEN WIRELESS SERVICES

(71) Applicant: Apple Inc., Cupertino, CA (US)

(72) Inventors: Haitong Sun, Irvine, CA (US); Wei Zeng, San Diego, CA (US); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/271,037

(22) Filed: Feb. 8, 2019

(65) Prior Publication Data
US 2019/0253137 A1     Aug. 15, 2019

Related U.S. Application Data

(60) Provisional application No. 62/630,682, filed on Feb. 14, 2018.

(51) Int. Cl.
*H04W 72/12* (2009.01)
*H04B 7/26* (2006.01)
*H04W 72/04* (2009.01)

(52) U.S. Cl.
CPC ...... *H04B 7/2643* (2013.01); *H04W 72/1289* (2013.01); *H04W 72/0453* (2013.01)

(58) Field of Classification Search
CPC ...................... H04W 72/0453; H04W 72/1289
(Continued)

(56) References Cited

U.S. PATENT DOCUMENTS

| 8,085,831 B2 | 12/2011 | Teague |
| 2008/0232307 A1* | 9/2008 | Pi .......................... H04L 1/1829 370/328 |

(Continued)

FOREIGN PATENT DOCUMENTS

| CN | 1985447 A | 6/2007 |
| CN | 106412918 A | 2/2017 |

(Continued)

OTHER PUBLICATIONS

"InterDigital Communications On eMBB/URLLC multiplexing for TDD", 3GPP TSG RAN WG1 Meeting #88bis R1-1705524, Apr. 3, 2017, p. 1-3.

*Primary Examiner* — Angel T Brockman
(74) *Attorney, Agent, or Firm* — Kowert, Hood, Munyon, Rankin & Goetzel, P.C.

(57) ABSTRACT

Techniques are disclosed relating to handling preemptive data services in cellular wireless transmissions. In some embodiments, a device wirelessly transmits uplink data for a first data service during a time dimension duplex (TDD) scheduled transmission interval using a first frequency band. While transmitting, in these embodiments, the device also monitors a downlink control channel that uses a second frequency band that does not overlap with the first frequency band. The downlink control channel may be dedicated for preemption indicators that indicate another service is preempting scheduled resources. In response to detecting an indicator in the downlink control channel of communications for a second data service in the first frequency band during the scheduled transmission interval, the device may reduce the transmission of the uplink data on resources used for the communications for the second data service (e.g., by blanking or transmitting at a lower power).

20 Claims, 7 Drawing Sheets

(58) Field of Classification Search
USPC .......................................................... 370/326
See application file for complete search history.

(56) References Cited

U.S. PATENT DOCUMENTS

| | | | |
|---|---|---|---|
| 2010/0151873 | A1 | 6/2010 | Gorokhov |
| 2017/0374562 | A1* | 12/2017 | Jeon ....................... H04W 76/15 |
| 2018/0035332 | A1* | 2/2018 | Agiwal ............. H04W 74/0858 |
| 2018/0035435 | A1 | 2/2018 | Gupta |
| 2018/0035459 | A1 | 2/2018 | Islam |
| 2018/0324830 | A1* | 11/2018 | Islam .................... H04L 5/0094 |

FOREIGN PATENT DOCUMENTS

| | | |
|---|---|---|
| CN | 106888079 A | 6/2017 |
| CN | 107241288 A | 10/2017 |
| WO | 2018016848 A1 | 1/2018 |

* cited by examiner

UPLINK TRANSMISSION PUNCTURING TO REDUCE INTERFERENCE BETWEEN WIRELESS SERVICES

PRIORITY DATA

This application claims priority to U.S. Provisional Patent Application No. 62/630,682, filed on Feb. 14, 2018, which is hereby incorporated by reference in its entirety.

FIELD

The present application relates to wireless communications, and more particularly to techniques for multiplexing different cellular services.

DESCRIPTION OF THE RELATED ART

Wireless communication systems are rapidly growing in usage. Additionally, there exist numerous different wireless communication technologies and standards. Some examples of wireless communication technologies include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others.

For some wireless communications standards, such as the 5G air interface physical layer design for example, various different types of services are being proposed. For example, an enhanced mobile broadband (eMBB) service may provide high-rate data service with a latency requirement (e.g., 4 ms) and an ultra reliable low latency (URLLC) service may provide highly reliable service with a lower latency requirement (e.g., 0.5 ms) than eMBB. Speaking generally, different services that use a unified physical layer framework may have very different natures in terms of reliability, latency, data rate, etc. Accommodating such different services while maintaining performance, low complexity, and low power consumption (e.g., both at the base station and mobile devices) may be challenging.

BRIEF DESCRIPTION OF THE DRAWINGS

A better understanding of the present subject matter may be obtained when the following detailed description of the embodiments is considered in conjunction with the following drawings, in which.

Figure 1:
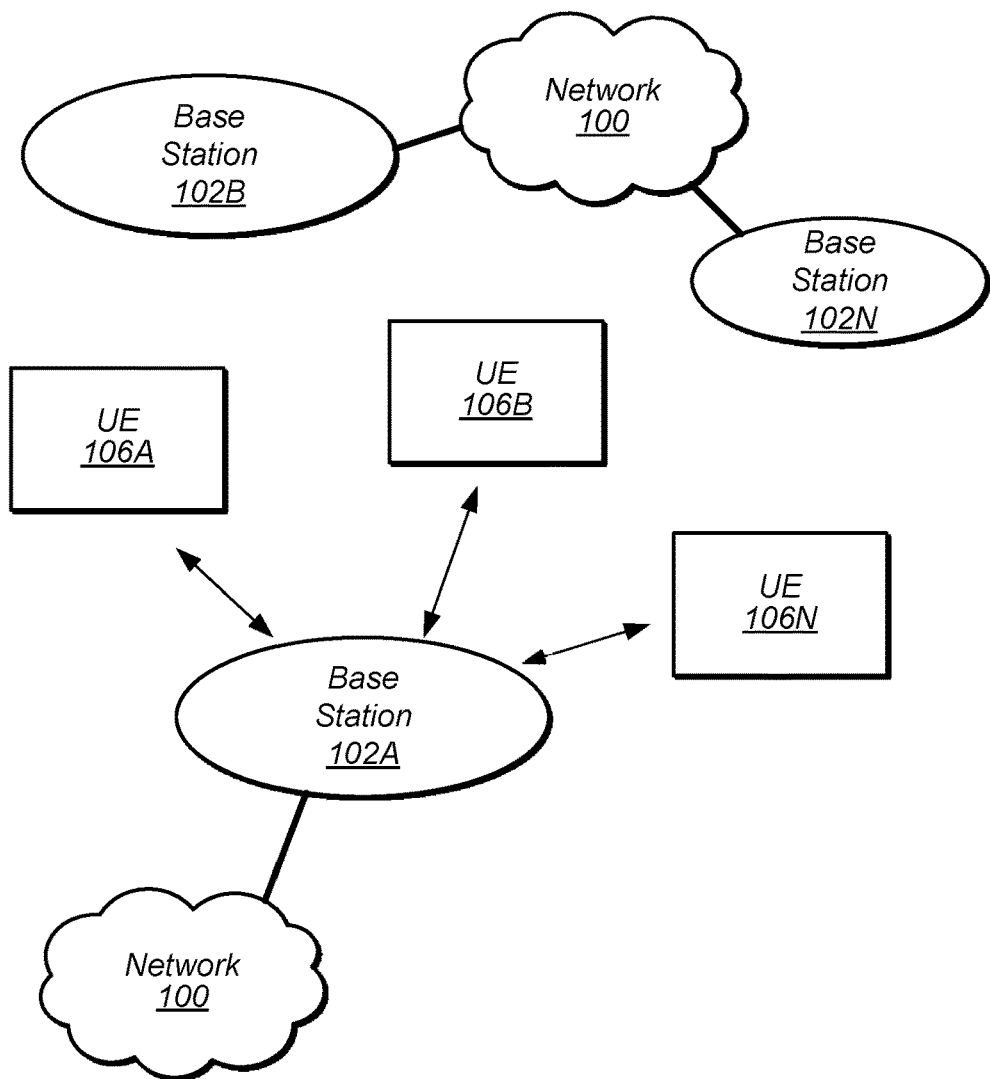
FIG. 1 illustrates an exemplary (and simplified) wireless communication system, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

DETAILED DESCRIPTION

Acronyms

The following acronyms may be used in the present disclosure.

3GPP: Third Generation Partnership Project
3GPP2: Third Generation Partnership Project 2
APN: Access Point Name
BLER: Block Error Rate (same as Packet Error Rate)

BER: Bit Error Rate
CRC: Cyclic Redundancy Check
DL: Downlink
GBR: Guaranteed Bit Rate
GSM: Global System for Mobile Communications
IMS: IP Multimedia Subsystem
IP: Internet Protocol
LTE: Long Term Evolution
MME: Mobility Management Entity
MO: Message Originating
MT: Message Terminating
NAS: Non-access Stratum
PCC: Policy and Charging Control
PCEF: Policy and Charging Enforcement Function
PCRF: Policy and Charging Rules Function
PCSCF: Proxy Call Session Control Function
PGW: Packet Gateway
PER: Packet Error Rate
QCI: Quality of Service Class Index
QoS: Quality of Service
RAT: Radio Access Technology
RRC: Radio Resource Control
SGW: Serving Gateway
SINR: Signal to Interference-and-Noise Ratio
SIR: Signal to Interference Ratio
SNR: Signal to Noise Ratio
Tx: Transmission
UE: User Equipment
UL: Uplink
UMTS: Universal Mobile Telecommunication System
VoLTE: Voice Over LTE Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., a smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless cellular telephone system or cellular radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually," where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
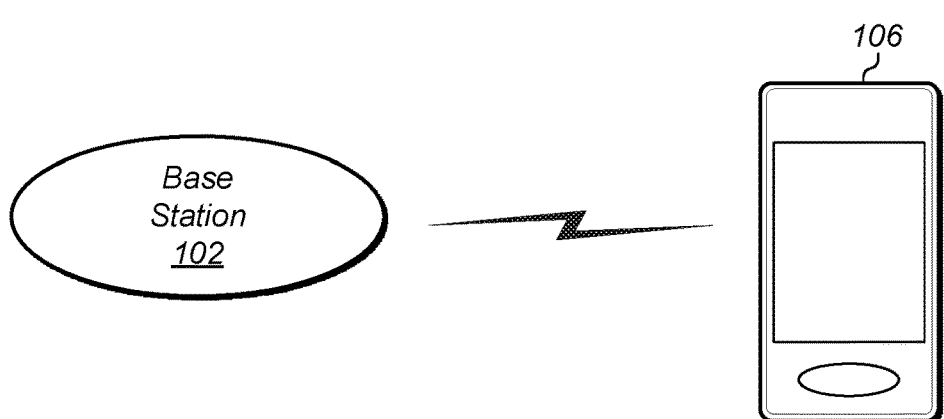
FIG. 2 illustrates a base station (BS) in communication with a user equipment (UE) device, according to some embodiments.

FIGS. 1 and 2—Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A-106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices (UEs) and/or between the UEs and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), HSPA, 3GPP2 CDMA2000 (e.g., 1×RTT, 1×EV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-160N and similar devices over a wide geographic area via one or more cellular communication standards.

Thus, while base station 102A may act as a "serving cell" for UEs 106A-160N as illustrated in FIG. 1, each UE 106 may also possibly come within communication range of, and be capable of receiving signals from, one or more other cells (which might be provided by base stations 102B-N and/or any other base stations), which may be referred to as "neighboring cells." Such cells may also be capable of facilitating communication between user devices and/or between user devices and the network 100, according to the same wireless communication technology as base station 102A and/or any of various other possible wireless communication technologies. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 may be configured to communicate using a wireless networking (e.g., Wi-Fi) and/or peer-to-peer wireless communication protocol (e.g., BT, Wi-Fi peer-to-peer, etc.) in addition to at least one cellular communication protocol (e.g., GSM, UMTS (WCDMA, TD-SCDMA), LTE, LTE-A, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A-106N) in communication with a base station 102 (e.g., one of the base stations 102A-102N), according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. Alternatively, or in addition, the UE 106 may include one or more integrated circuits configured to perform any of the method embodiments described herein.

The UE 106 may include one or more antennas for communicating using one or more wireless communication protocols or technologies. In some embodiments, the UE 106 is configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate (and possibly multiple) transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

Figure 3:
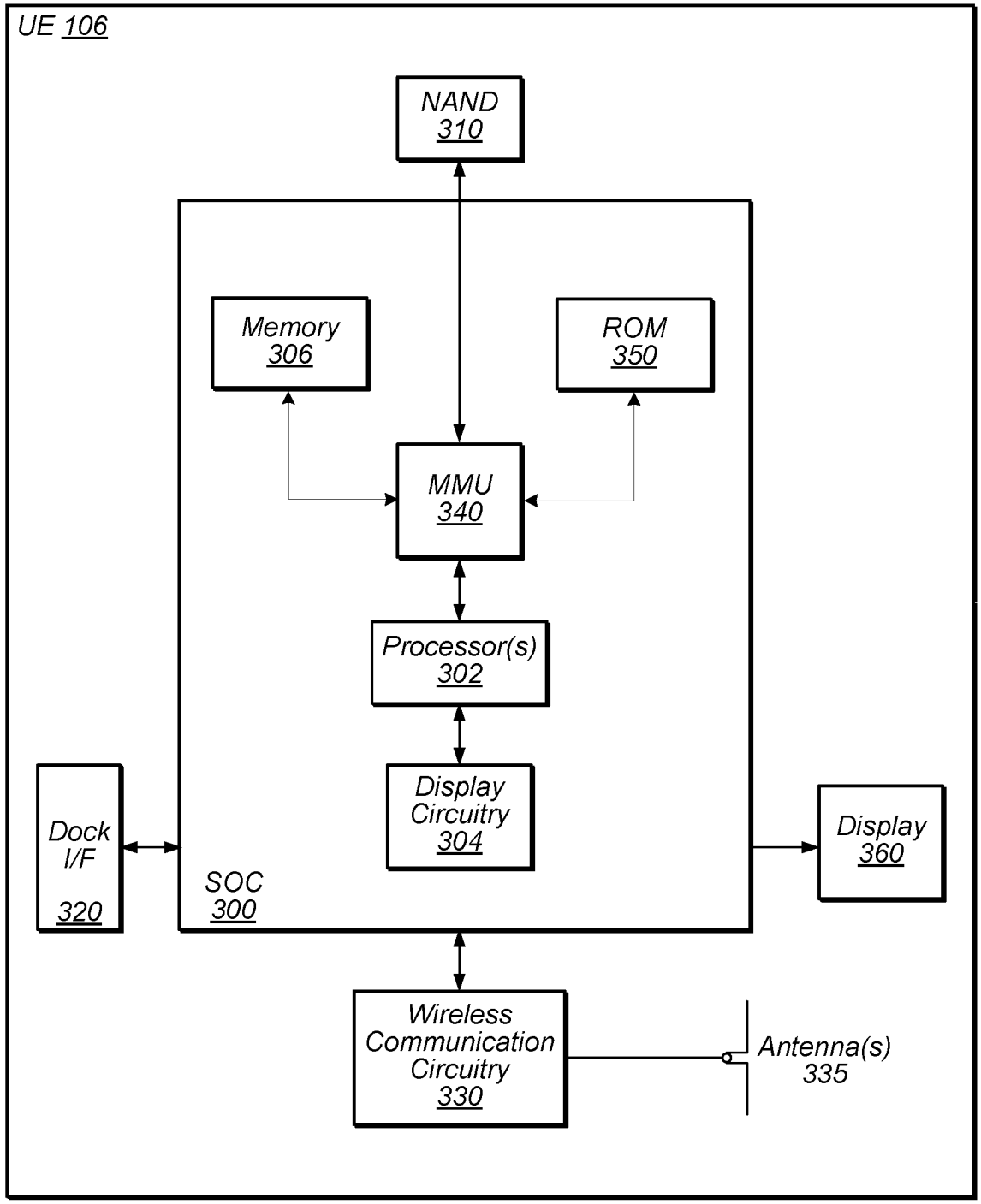
FIG. 3 illustrates an exemplary block diagram of a UE, according to some embodiments.

FIG. 3—Exemplary Block Diagram of a UE

FIG. 3 illustrates an exemplary block diagram of a UE 106, according to some embodiments. As shown, the UE 106 may include a system on chip (SOC) 300, which may include processing elements for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, Wi-Fi, GPS, etc.).

The UE device 106 may include at least one antenna (and possibly multiple antennas, e.g., for MIMO and/or for implementing different wireless communication technologies, among various possibilities), for performing wireless communication with base stations and/or other devices. For example, the UE device 106 may use antenna(s) 335 to perform the wireless communication. As noted above, the UE 106 may be configured to communicate wirelessly using multiple wireless communication technologies in some embodiments.

As described further subsequently herein, the UE 106 may include hardware and software components for implementing features and methods described herein. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition), the processor 302 of the UE device 106, in conjunction with one or more of the other components 300, 304, 306, 310, 320, 330, 335, 340, 350, 360 may be configured to implement part or all of the features described herein.

Figure 4:
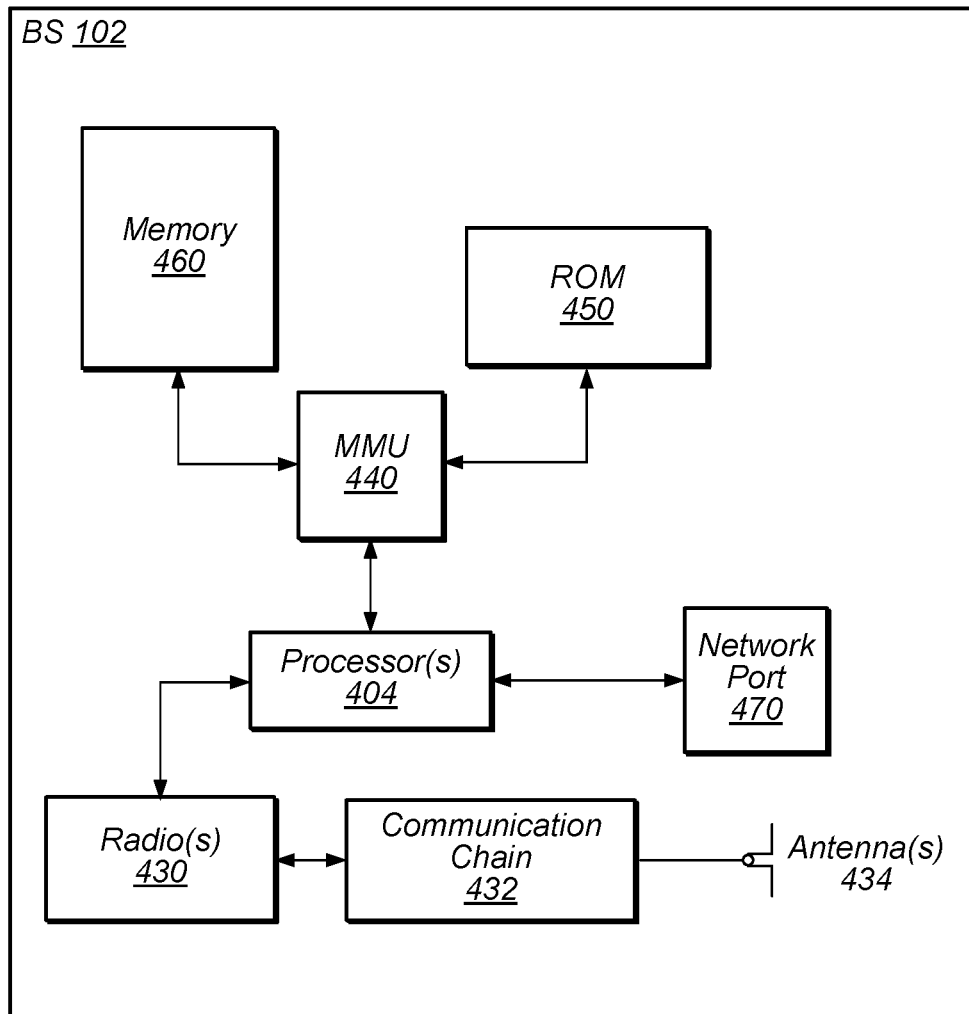
FIG. 4 illustrates an exemplary block diagram of a BS, according to some embodiments.

FIG. 4—Exemplary Block Diagram of a Base Station

FIG. 4 illustrates an exemplary block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi).

The base station 102 may include hardware and software components for implementing or supporting implementation of features described herein. The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition), the processor 404 of the base station 102, in conjunction with one or more of the other components 430, 432, 434, 440, 450, 460, and/or 470, may be configured to implement or support implementation of part or all of the features described herein.

Overview of Service Multiplexing Techniques

In various embodiments, it may be challenging to support data services with different characteristics in a unified physical layer framework, while still maintaining performance, low complexity, and low power consumption. For example URLLC signaling with a very low latency and ultra-high reliability requirement may need to be scheduled when an eMBB transmission is ongoing, in order to achieve the target latency (e.g., waiting for the eMBB transmission to finish may take longer than the greatest amount of latency allowed for URLLC). Further, different data services may use slots of different lengths, e.g., eMBB slots may use 14 symbols while URLLC may be able to use mini slots with 2, 4, or 7 symbols.

Therefore, in various embodiments, multiplexing techniques are used by one or more processors to share physical layer time and frequency resources between different services. URLLC and eMBB are discussed herein for purposes of illustration, but are not intended to limit the scope of the present disclosure; the disclosed techniques may be utilized between any of various different data services.

Speaking generally, if there are unused time and/or frequency resources during eMBB transmissions, a base station may be configured to schedule URLLC transmissions using the empty resources such that they do not affect other data transmission. If unused resources are not available, in some embodiments URLLC may be allowed to preempt eMBB transmission, which may meet URLLC latency requirements but may contaminate eMBB data and degrade performance of eMBB packets (e.g., degrading block error rate (BLER)). Further, UL eMBB transmissions by nearby UEs may interfere with URLLC transmissions. Therefore, in some embodiments, other UEs are configured to puncture their UL resources (e.g., by refraining from transmitting or transmitting with a lower power) to reduce interference with URLLC communications.

Exemplary Indicator for FDD Systems

Figure 5:
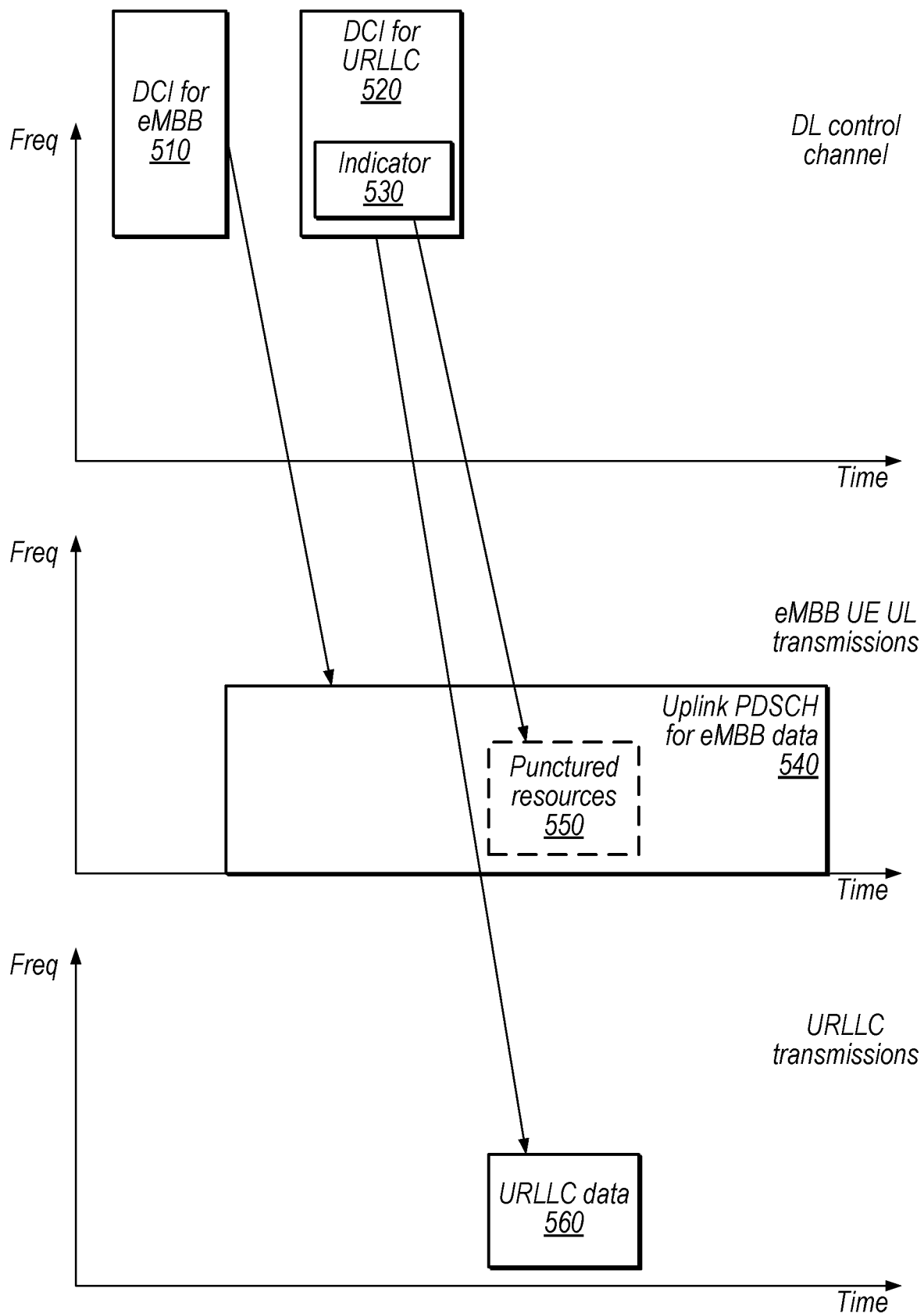
FIG. 5 illustrates exemplary puncturing of eMBB uplink transmissions based on an indication of resources for a URLLC communication, according to some embodiments.

FIG. 5 is a block diagram illustrating exemplary puncturing of eMBB UL transmissions to avoid interference with URLLC communications. In the illustrated embodiment, the upper plot represents a DL control channel, the middle plot represents eMBB UL transmissions, and the lower plot represents URLLC transmissions (which may be uplink or downlink). While the three plots are shown separately, they may correspond to the same set of time-frequency resources (e.g., the URLLC data 560 is communicated using a portion of the same time and frequency resources as the UL EMBB data 540, as shown).

The downlink control channel, in the illustrated embodiment, includes downlink control information (DCI) for eMBB 510 that includes control information for the UL PUSCH for eMBB data 540. For example, the DCI 510 may indicate resources scheduled for the UL transmission, among other information. In the illustrated embodiment, the downlink control channel also includes DCI for URLLC 520 that includes control information for the URLLC data 560. In the illustrated embodiment, DCI 520 includes an indicator 530 that indicates resources used by the URLLC communication. In various embodiments, the indicator 530 may be included in a URLLC DCI or may be separately communicated.

In some embodiments, the indicator is UE-specific. In some embodiments, the indicator is group specific, e.g., in a group common Physical Downlink Control Channel (GC-PDCCH). In some embodiments, the indicator is common to multiple UEs. In some embodiments, the indicator is transmitted in dedicated signaling.

A UE transmitting the eMBB data 540, in the illustrated embodiment, is configured to puncture its transmission in a region (shown as punctured resources 550) to reduce interference with the URLLC data 560. In some embodiments, the UE therefore performs full duplex communications by monitoring the downlink control channel at the same time it transmits uplink data. In some embodiments, the different frequency bands of the uplink data and downlink control channel may avoid interference between the transmitted data and received control channel. When the UE detects the indicator 530 in the control channel, it may proceed to puncture its indicated transmissions.

As one example of puncturing, the UE may completely blank transmissions using the indicated resources in the time and/or frequency dimension. As another example, the UE may reduce transmission power for the indicated resources. The power reduction may be controlled in the time and/or frequency dimension, in various embodiments. For example, in some embodiments, the UE may reduce power during the URLLC data communication over all frequencies while in other embodiments, the UE may reduce power only for the specified time and frequencies. In some embodiments, multiple UEs in the area monitor for indicator 530 and puncture their transmissions if needed. In various embodiments, the disclosed techniques may improve wireless performance for a UE transmitting or receiving the URLLC data 560 by reducing interference from one or more other UEs.

Figure 6A:
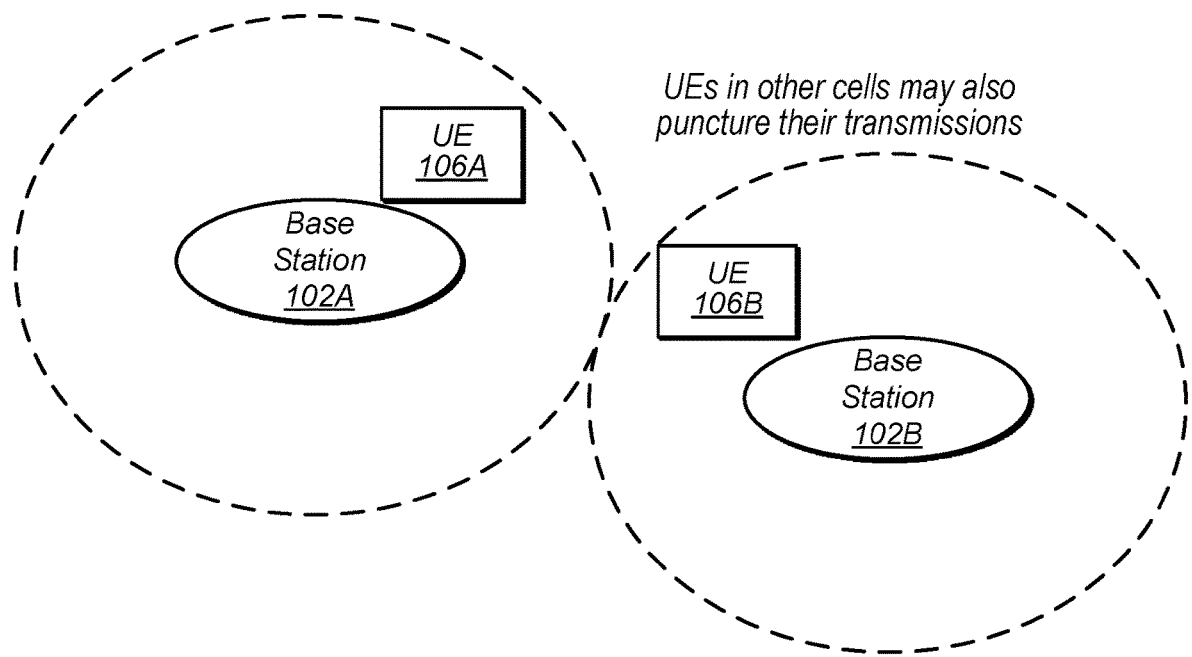
FIG. 6A illustrates exemplary signaling to UEs on other cells, according to some embodiments.

FIG. 6A is a diagram illustrating exemplary adjacent cells, according to some embodiments. In some embodiments, UEs in other cells may also puncture their transmissions based on the indicator 530. For example, if base station 102A is performing URLLC communications with UE 106A, UE 106B in the adjacent cell may puncture its transmissions based on an indication from base station 102A. In some embodiments, cell specific information may enable scrambling to avoid interference between puncture indicators from different base stations. Therefore, in some embodiments, UEs may monitor for puncture indicators from multiple different base stations at the same time while performing uplink transmissions.

Figure 6B:
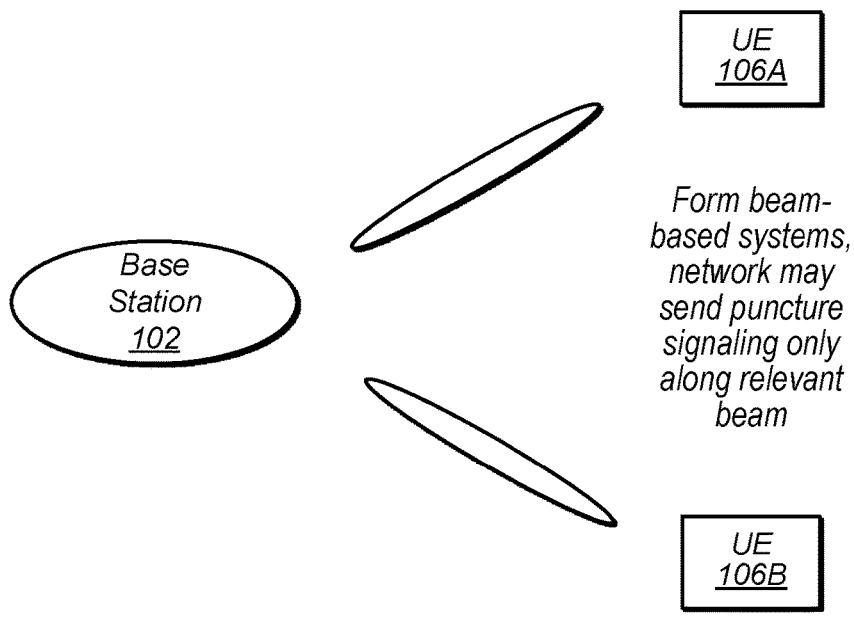
FIG. 6B illustrates exemplary indicator techniques for beam-based systems, according to some embodiments.

FIG. 6B is a diagram illustrating exemplary beam-based communications, according to some embodiments. In embodiments that use beam-forming, devices on one beam may cause very limited interference with devices on other beams. For example, in the illustrated embodiment, UL transmission from UE 106B may not substantially interfere with communications with UE 106A. Therefore, in some embodiments, base station 102 is configured to send a puncture indication only along one or more beams actually used by a URLLC device.

Exemplary TDD Techniques

Figure 7:
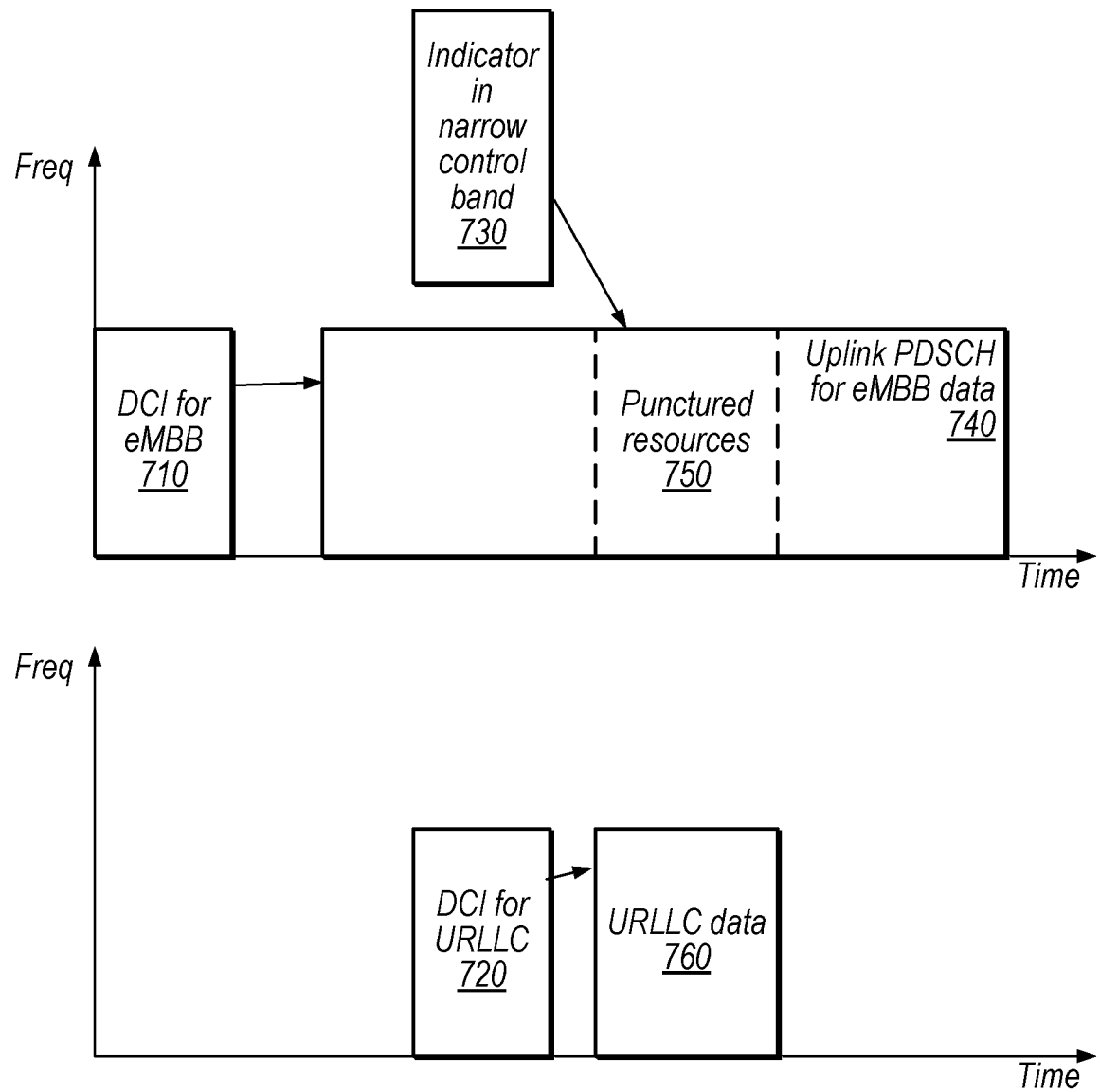
FIG. 7 illustrates exemplary puncturing of eMBB uplink transmission in a TDD context, according to some embodiments.

FIG. 7 is a diagram illustrating exemplary puncturing of TDD eMBB UL transmissions based on URLLC communications. In some embodiments, time-dimension duplexing (TDD) communications switch between uplink and downlink transmissions, e.g., using the same set of frequency resources.

For example, as shown, the downlink DCI for eMBB 710 is transmitted using the same frequency resources (but at a different time) than the UL eMBB data 740 that it controls. Similarly, the downlink DCI for URLLC 720 is transmitted using the same frequency resources as the URLLC data 760. Note that the eMBB UE may not be able to detect the DCI 720, e.g., because the eMBB UE is in UL transmission mode and unable to perform DL reception at the same time in TDD implementations.

Therefore, in some embodiments, the base station is configured to transmit a puncture indicator 730 in a control band (which may be a narrow dedicated frequency band) that is separate from the band used for TDD communications, as shown. In these embodiments, eMBB UEs may monitor the control band for the indicator while they are performing TDD UL transmissions, and appropriately puncture resources used by URLLC (e.g., punctured resources 750, in the illustrated example).

Exemplary Methods

Figure 8:
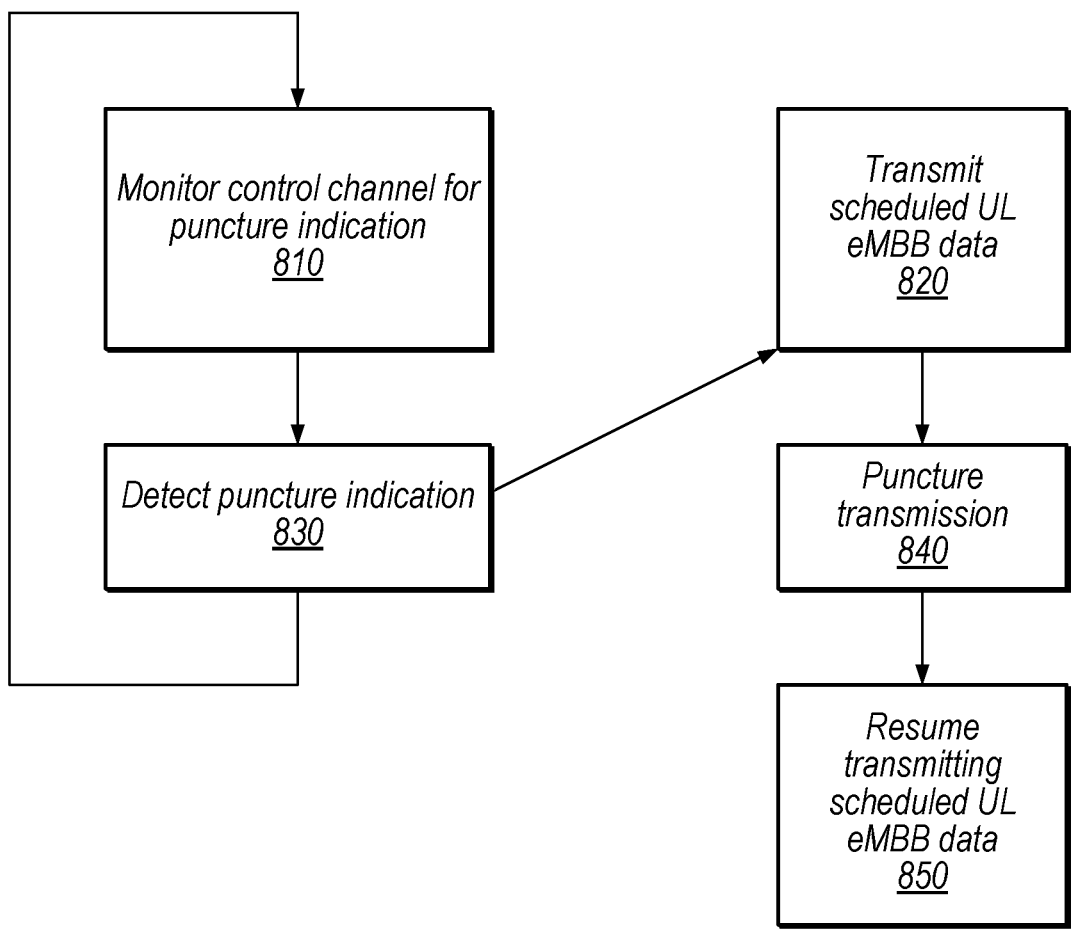
FIG. 8 illustrates an exemplary method for puncturing UL transmissions, according to some embodiments.

FIG. 8 is a flow diagram illustrating an exemplary method performed by a eMBB UE, according to some embodiments. The method shown in FIG. 8 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 810, in the illustrated embodiment, a UE 106 monitors (e.g., using a wireless radio and one or more processors) a control channel for a puncture indication. The control channel may be dedicated for puncture indication (e.g., for TDD) or may be used for other control information as well.

At 820, in the illustrated embodiment, at least partially in parallel with the monitoring of element 810, the UE 106 transmits scheduled UL eMBB data.

At 830, in the illustrated embodiment, the UE 106 detects a puncture indication in the control channel and punctures its transmission at 840. The puncturing may include blanking time and/or frequency portions of one or more scheduled transmissions or transmitting at a lower power, for example.

At 850, in the illustrated embodiment, the UE 106 resumes transmitting the scheduled UL eMBB data. The UE may re-send blanked transmissions at a later time, for example, or wait to determine whether the base station 102 received reduced-power transmissions before resending.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, an apparatus comprises means for performing one or more of the method elements of FIG. 7.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
one or more processors configured to:
wirelessly transmit uplink data for a first data service during a time dimension duplex (TDD) scheduled transmission interval using a first frequency band;
monitor, while transmitting the uplink data, a downlink control channel that uses a second frequency band that does not overlap with the first frequency band; and
in response to detecting an indicator, in the downlink control channel, of communications for a second data service in the first frequency band during the scheduled transmission interval, reduce the transmission of the uplink data on resources used for the communications for the second data service.

2. The apparatus of claim 1, wherein the first data service is eMBB and the second data service is URLLC.

3. The apparatus of claim 1, wherein the reduction includes reduced transmission power during the communications for the second data service.

4. The apparatus of claim 1, wherein the reduction includes blanking of transmissions on one or more frequency resources during the communications for the second data service.

5. The apparatus of claim 1, wherein the indication specifies time resources of the communications for the second data service.

6. The apparatus of claim 1, wherein the indicator is from another base station that is different from a base station to which the uplink data is transmitted.

7. The apparatus of claim 1, wherein the downlink control channel is a dedicated band control channel for service preemption indicators.

8. A method, comprising:
receiving, by a base station, uplink data wirelessly transmitted from a first mobile device for a first data service, in a first frequency band, during a time dimension duplex (TDD) scheduled transmission interval; and
in response to a request for communications with a second mobile device for a second data service, transmit an indicator in a downlink control channel that uses a second frequency band that does not overlap with the first frequency band, wherein the indicator specifies transmission resources for the communication for the second data service.

9. The method of claim 8, wherein the first data service is eMBB and the second data service is URLLC.

10. The method of claim 8, wherein the indication specifies time resources of the communications for the second data service.

11. The method of claim 8, wherein the base station is not acting as a serving base station for the first mobile device when transmitting the indicator.

12. The method of claim 8, wherein the downlink control channel is a dedicated band control channel for service preemption indicators.

13. The method of claim 8, wherein the transmission of the indicator is only in one or more beam target directions associated with communications for the second mobile device.

14. The method of claim 8, wherein the indicator is a common indicator.

15. The method of claim 8, wherein the indicator is UE-specific.

16. The method of claim 8, wherein the indicator requests a reduction in transmission power for the transmission resources.

17. The method of claim 8, wherein the indicator requests blanking of transmissions using the transmission resources.

18. A method, comprising:
- wirelessly transmitting, by a mobile device, uplink data for a first data service during a time dimension duplex (TDD) scheduled transmission interval using a first frequency band;
- monitoring, by the mobile device while transmitting the uplink data, a downlink control channel that uses a second frequency band that does not overlap with the first frequency band; and
- in response to detecting an indicator, in the downlink control channel, of communications for a second data service in the first frequency band during the scheduled transmission interval, the mobile device reducing the transmission of the uplink data on resources used for the communications for the second data service.

19. The method of claim 18, wherein the reducing includes using reduced transmission power during the communications for the second data service or blanking of transmissions on one or more frequency resources during the communications for the second data service.

20. The method of claim 18, wherein the downlink control channel is a dedicated band control channel for service preemption indicators.

* * * * *